United States Patent
Garg

(10) Patent No.: US 9,167,295 B2
(45) Date of Patent: Oct. 20, 2015

(54) MULTI-SOURCE CONTENT RETRIEVAL

(75) Inventor: Amit Garg, Delran, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 876 days.

(21) Appl. No.: 13/154,722

(22) Filed: Jun. 7, 2011

(65) Prior Publication Data

US 2012/0317225 A1  Dec. 13, 2012

(51) Int. Cl.
| | |
|---|---|
| *G06F 15/16* | (2006.01) |
| *H04N 21/44* | (2011.01) |
| *H04L 12/18* | (2006.01) |
| *H04L 29/08* | (2006.01) |
| *H04N 21/2387* | (2011.01) |
| *H04N 21/2747* | (2011.01) |
| *H04N 21/433* | (2011.01) |
| *H04N 21/472* | (2011.01) |
| *H04N 21/6405* | (2011.01) |
| *H04N 21/6408* | (2011.01) |
| *H04N 21/6543* | (2011.01) |
| *H04N 21/6583* | (2011.01) |
| *H04N 21/6587* | (2011.01) |

(52) U.S. Cl.
CPC ...... *H04N 21/44004* (2013.01); *H04L 12/1859* (2013.01); *H04L 67/2842* (2013.01); *H04N 21/2387* (2013.01); *H04N 21/2747* (2013.01); *H04N 21/4334* (2013.01); *H04N 21/47214* (2013.01); *H04N 21/6405* (2013.01); *H04N 21/6408* (2013.01); *H04N 21/6543* (2013.01); *H04N 21/6583* (2013.01); *H04N 21/6587* (2013.01)

(58) Field of Classification Search
CPC ........................................................ H04L 29/06
USPC ........................................................ 709/217
See application file for complete search history.

(56) References Cited

U.S. PATENT DOCUMENTS

| | | | |
|---|---|---|---|
| 2004/0103429 A1* | 5/2004 | Carlucci et al. | ................. 725/32 |
| 2009/0064252 A1* | 3/2009 | Howarter et al. | ............. 725/114 |
| 2010/0115574 A1* | 5/2010 | Hardt et al. | .................... 725/139 |

* cited by examiner

*Primary Examiner* — Shripal Khajuria
(74) *Attorney, Agent, or Firm* — Banner & Witcoff, Ltd.

(57) ABSTRACT

An apparatus, method, and system are provided for providing content to a user. In some embodiments the content may be transmitted using a first transmission technique. In some embodiments, when the user "catches up to" the content as it is being received via the first transmission technique, a switch may be made to obtain the content via a second transmission technique, allowing reception of the content via the first transmission technique to be terminated. In some embodiments, a user equipment device may include a buffer that may be used to store the content received via the second transmission technique, which may support earlier termination with respect to receiving content via the first transmission technique. In some embodiments, the buffer may support a rewind operation.

20 Claims, 7 Drawing Sheets

MULTI-SOURCE CONTENT RETRIEVAL

BACKGROUND

The transmission and distribution of content over networks has evolved over the years. Users expect a service provider to be able to deliver content in various formats and at various times. No longer are users restricted to a passive viewing experience, as users want control over content.

Given a particular system configuration and associated bandwidth, dedicating resources to particular users may be expensive and burdensome. For example, establishing a unicast session with a user equipment device (UED) consumes bandwidth that might otherwise be available for alternate uses.

SUMMARY

This summary is not intended to identify critical or essential features of the disclosure provided herein, but instead merely summarizes certain features and variations thereof.

In some illustrative embodiments, a network recording service may be used to record selected content to support access to the selected content at a later point in time. The recording may be requested by a user equipment device (UED) and a unicast session may be established to provide the recording to the UED and/or a display device (e.g., via a unicast sourcing technique). In some illustrative embodiments, as an alternative to (or in addition to) establishing a unicast session, the recording may be downloaded to the UED and/or display device (e.g., via a downloading sourcing technique).

In some illustrative embodiments, when a UED receives recorded content, the UED may tune to and receive a broadcast or multicast distribution of content corresponding to the selected content from a broadcast or multicast source (or via a broadcast or multicast source technique). The received broadcast or multicast content may be recorded or saved in a memory or buffer at or associated with the UED. In some embodiments, there may be a time delay between when the UED requests or receives the recorded content and when the UED receives and/or records the broadcast or multicast content.

In some illustrative embodiments, the UED may be directed to switch displayable content provided to the display device from the downloaded content or content received via the unicast session to content received from a broadcast or multicast distribution source. In some illustrative embodiments, the UED may switch the displayable content from the downloaded content or content received via the unicast session to the content stored in the buffer of the UED. In some illustrative embodiments, responsive to making the switch, the unicast session involving the UED may be terminated.

In some illustrative embodiments, the UED may receive one or more inputs from one or more input devices. The one or more inputs may direct the UED to engage in a rewind operation with respect to content shown on, or provided to, a display device. The rewind operation may result in a display of content corresponding to an earlier point in time. In response to the rewind operation, the UED may engage in a comparison to determine whether content is available in the buffer. If the content is not available in the buffer, a unicast session may be (re)established with a content source in order to obtain the content via a unicast distribution. In some illustrative embodiments, the UED may request a (re)establishment of the unicast session in advance of a depletion of the stored content in the buffer in order to provide a seamless and transparent transition from providing displayable content based on content stored in the buffer to providing displayable content based on content obtained via the (re)established unicast session in order to account for the appreciable time associated with (re)establishing the session.

Other details and features will also be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

DETAILED DESCRIPTION

Various connections and/or communication links between elements are discussed in the following description. These connections and/or links are general and, unless specified otherwise, may be direct or indirect, wired or wireless, and this specification is not intended to be limiting in this respect.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
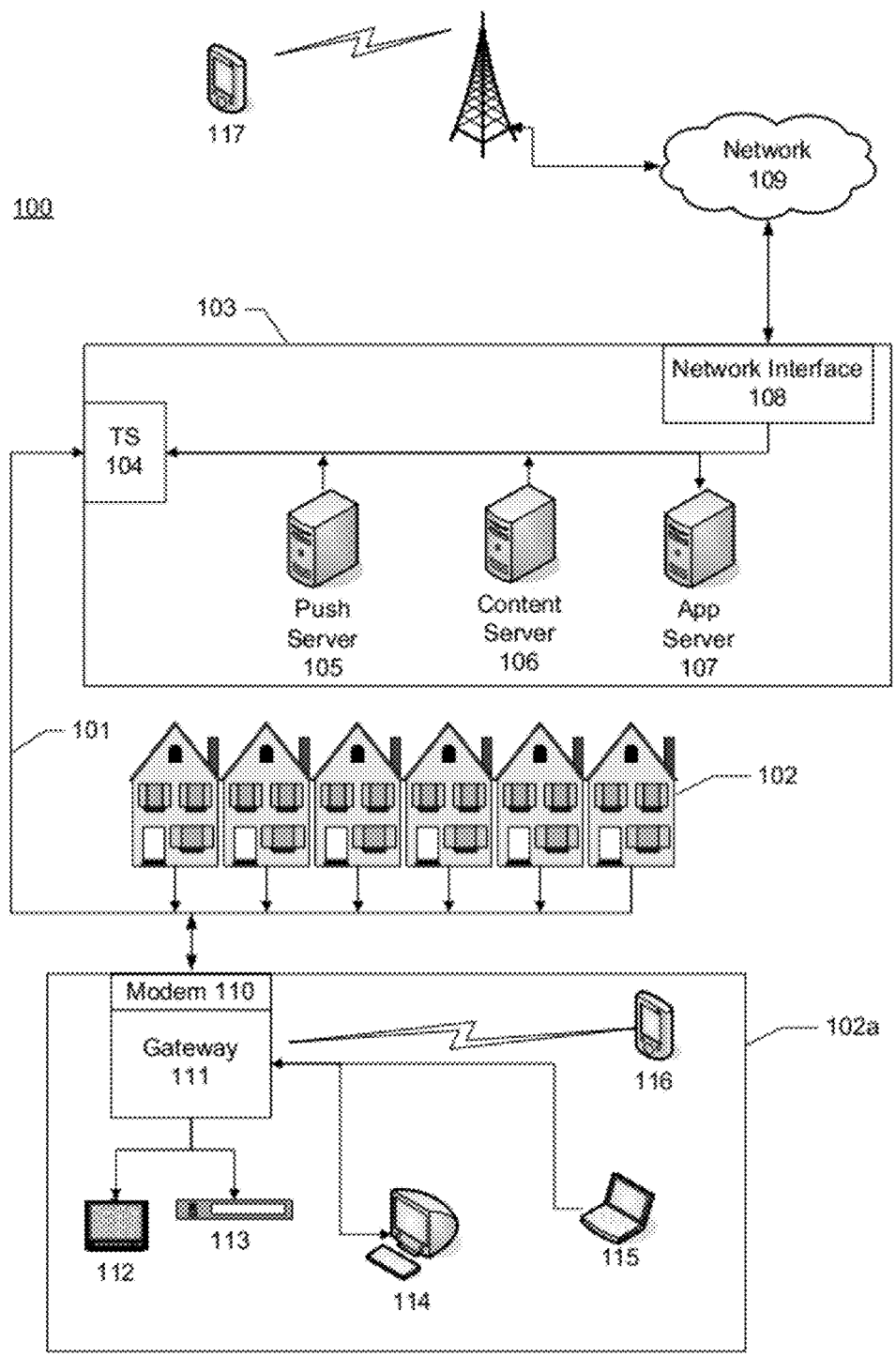
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office or headend 103. The central office 103 may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (TS) 104, such as a cable modem termination system (CMTS), which may be a computing device configured to manage communications between devices on the network of lines 101 and backend devices such as servers 105-107 (to be discussed further below). The termination system (TS) may be as specified in a standard, such as the Data Over Cable Service Interface Specification (DOCSIS) standard, published by Cable Television Laboratories, Inc. (a.k.a. CableLabs), or it may be a similar or modified device instead. The termination system (TS) may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide or interactive program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for receiving user remote control commands, and processing them to provide an intelligent remote control experience.

An example premises 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
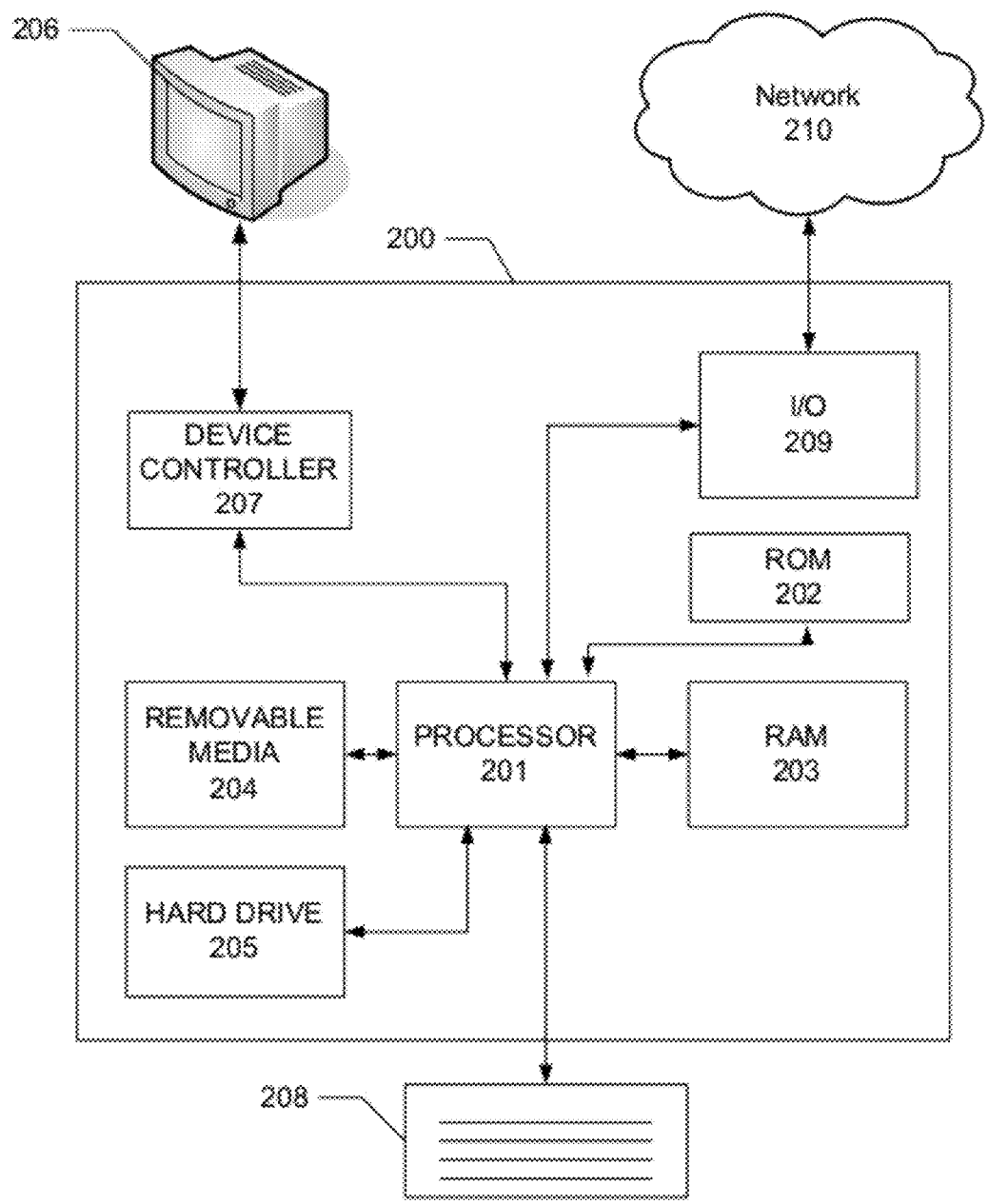
FIG. 2 illustrates an example hardware platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

By way of introduction and example, narrowcast content distribution may be facilitated by the use of a recording service. Digital video recording (DVR) is one example of such a recording service. When content is recorded at a user equipment device (UED), such as computing device 200 of FIG. 2, the recording service may be referred to as a UED DVR. When the content is recorded at a central location (e.g., central office 103 of FIG. 1) or at some location outside of the user's premises, the recording service may be referred to as network(ed) DVR (NDVR).

DVR may be used to record content that a user wishes to store or view at a later point in time. For example, and referring to the timeline shown in FIG. 3 (not drawn to scale), the user may want to record a program that is scheduled to air from 9:00 PM to 9:30 PM because the user may have plans for the evening that require her to be away from her premises (e.g., premises 102 of FIG. 1) until 9:10 PM. In this respect, at 7:30 PM (or at any other time, not necessarily prior to the airing of the program) the user may schedule a recording of the program as shown in point #1 in FIG. 3. Then, at 9:00 PM, the recording of the program may be initiated as shown in point #2 in FIG. 3.

When the user arrives home at 9:10 PM, she may want to start watching the program from the beginning (as shown in point #3 in FIG. 3) and may indicate as such by depressing a button on a remote control, selecting to watch the recording from one or more menus, or the like. If the recording was conducted using NDVR, the recorded content may be transmitted to the UED. The transmission of the recorded content to the UED may result in the recorded content being downloaded and saved at the UED. Alternatively, or additionally, a unicast session may be established between the UED and a source providing the recorded content (e.g., a server located at a central location, such as central location 103 of FIG. 1) to facilitate the transmission of the recorded content to the UED. The recorded content received at the UED may be played back, or more generally, accessed, at the UED. The user may fast forward (FF) through one or more portions of the recorded content (e.g., commercials or advertisements) as shown in point #5 of FIG. 3. The FF may correspond to a request for accelerated playback of the recorded content in some embodiments. If the user FFs through enough of the recorded content, it may be possible that the user will "catch-up" to the live airing of the program, coinciding with point #6 of FIG. 3. For example, if the user begins watching the recorded program at 9:10 PM and FFs through the first ten minutes of recorded content at a rate of ten times (10×) normal speed, the user may "catch-up" to the live airing of the program slightly after 9:11 PM as shown.

A number of issues may need to be addressed once the user catches-up to the live airing of the program. For example, the central location may continue to record the content and the UED may continue to receive recorded content via a unicast distribution model. Such an approach may be expensive from a service provider's perspective in terms of network resource consumption. For example, if ninety-nine other users are in a similar position, having caught up to a (live) distribution of content they are currently watching based on having played back a recording at an accelerated speed (e.g., via fast forwarding), continuing to distribute the content to the one-hundred total users based on recordings may result in one-hundred unicast sessions/transmissions in some embodiments.

Figure 3:
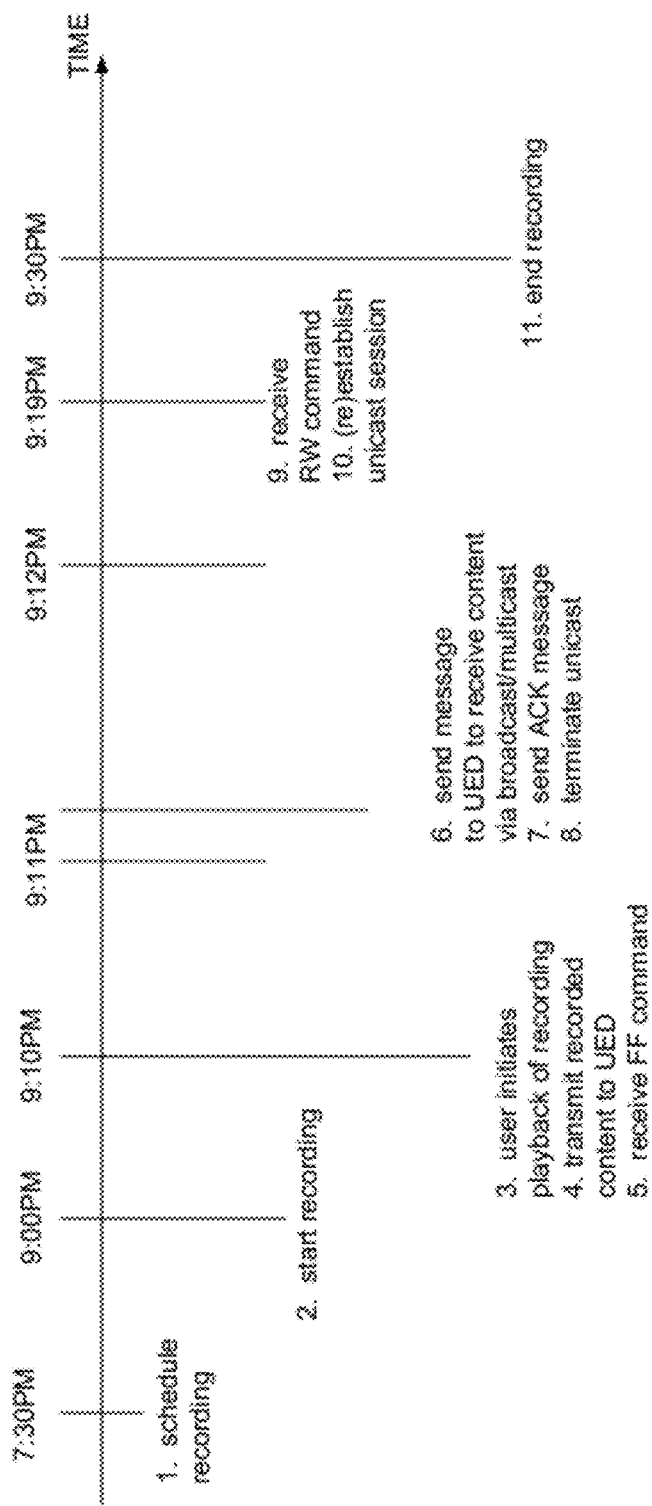
FIGS. 3-4 illustrate example event timelines in accordance with one or more aspects of this disclosure.

In order to preserve transmission bandwidth, when a user "catches-up" to a live airing of content, the central location may send a message to the UED as shown in point #6 of FIG. 3. The message may direct the UED to start receiving the content via broadcast or multicast, or another transmission technique that is less burdensome to the provider's network and its resources.

In some embodiments, the UED may transmit an acknowledge (ACK) message to the central location that notifies the central location that the UED has started receiving the content via broadcast or multicast as shown in point #7 of FIG. 3. In some embodiments, and particularly those where unicast sessions are or have been established, responsive to receiving the ACK message, the central location may terminate a unicast transmission of the recorded content to the UED by terminating a unicast session as shown in point #8 of FIG. 3. Having the central location wait to receive the ACK message before terminating the unicast transmission of the recorded content may help to ensure that the switch is seamless or transparent from a user perspective, particularly where UEDs are subject to variable processing loads or where UEDs are able to make the switch at various speeds.

Alternatively, or additionally, the provider, via its central location, for example, may terminate a unicast transmission (point #8 of FIG. 3) of the recorded content to the UED after a predetermined time period after the central location sent the message to the UED in connection with point #7 of FIG. 3. Terminating the unicast transmission after a predetermined time period without the use of an ACK message may help to preserve processing resources throughout the network and/or UEDs and may simplify logic and/or circuitry needed to support upstream communications between the central location and the UED.

In some embodiments, when the UED begins receiving the content as distributed via broadcast or multicast, for example, the central location may continue to record the content as initially requested by the user. Referring back to the earlier example of the user requesting a program to be recorded from 9:00 PM to 9:30 PM, when UED begins receiving the broadcast or multicast content shortly after 9:11 PM, the central location may continue to record the program to its completion at 9:30 PM. The program may continue to be recorded for any number of reasons. For example, after the program finishes at 9:30 PM, the user may want to go back and watch the entirety of the program, or portions of it, at a later point in time (e.g., starting at 9:35 PM).

Thus, network resources may be preserved by switching a UED to broadcast or multicast when a user catches-up to the broadcast or multicast (or similar) distribution. Another question or issue that may be raised relates to the user selecting to "rewind" after having made the switch. Referring back to the earlier example, at 9:19 PM (which may coincide with a commercial break during the broadcast or multicast of the program) the user may initiate a rewind (RW) function via one or more devices (e.g., using a RW button on a remote control, depressing a key or selecting a RW option from a menu item using a computer or mobile device, etc.) as shown in point #9 of FIG. 3. For example, starting at 9:19 PM the user may want to RW to a point in time coinciding with the content as it was being distributed via broadcast or multicast at 9:13 PM. To support the RW function, a unicast session may be (re)established between the central location and the UED in order to retrieve the recorded content via NDVR as shown in point #10 of FIG. 3. Point #11 of FIG. 3 reflects the end of the recording of the program at 9:30 PM.

Reestablishing the unicast session to facilitate the RW operation may, in some instances, not result in a quality user experience. For example, reestablishing the unicast session may entail an exchange of messages between the UED and the central location. Until the session is reestablished, the UED may continue to receive the content as it is being distributed via broadcast or multicast, for example, resulting in an appreciable or noticeable time lag or delay until the switch back to unicast is made. In some embodiments, this lag may manifest itself as a blip on a display device associated with the UED.

In order to address the lag that may be incurred in reestablishing the unicast session, in some embodiments the UED may include a memory or buffer that may be used to store the broadcast or multicast content as it is received at the UED. The memory or buffer may also be used to store a download of the recorded content. Referring back to the earlier example, when the user initiated a playback of the recorded content starting at 9:10 PM (point #3 of FIG. 3), the central location may determine that the content was still being recorded at the central location. In response to such a determination, the central location may send a message to the UED directing the UED to tune a (second) tuner to the broadcast or multicast distribution and to start recording the content received via the broadcast or multicast distribution as shown in point #3a of FIG. 4. In this manner, the UED may have a local copy of the content as it was being transmitted via broadcast or multicast, for example, starting at 9:10 PM. In this manner, if at 9:19 PM the user wanted to RW to a point in time coinciding with the broadcast or multicast distribution at 9:13 PM, the content saved in the UED's buffer may be used to supply the displayed content during the RW operation. The UED might not have to (re)establish a unicast session with the central location in such embodiments (as reflected via the deletion of point #10 from FIG. 4, relative to the inclusion of point #10 in FIG. 3).

Figure 4:
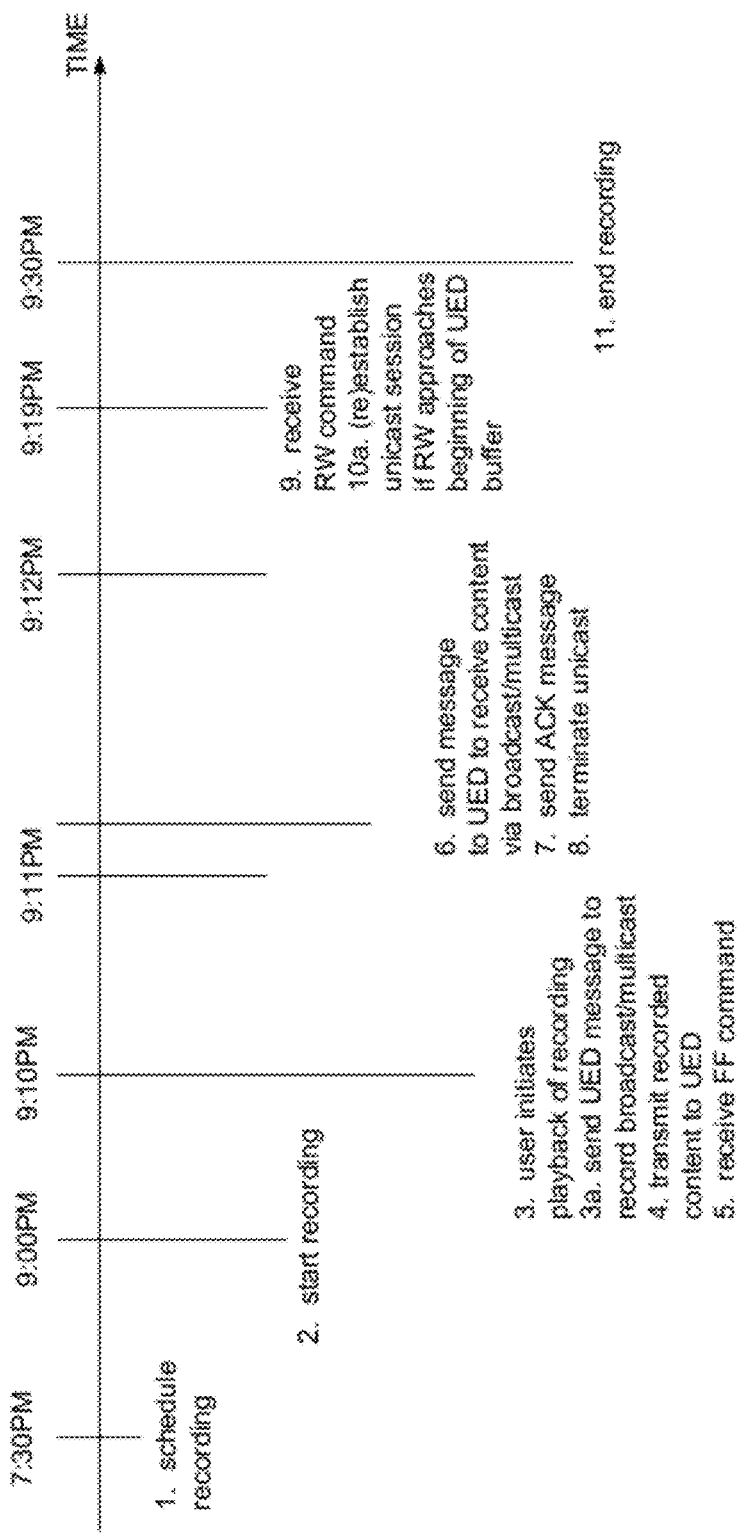

Continuing the above example, if at 9:19 PM the user wanted to RW to a point in time that was prior to 9:10 PM (when the user initiated a playback of the recorded content via NDVR as shown in point #3 of FIGS. 3 and 4), the displayed content during the RW operation may include a combination of content stored in the UED's buffer and the recorded content that is stored at the central location. For example, if the user RWs to a point in time that is proximate to the earliest content that is stored in the UED's buffer, the UED may initiate a background exchange of messages with the central location to reestablish the unicast session (as shown in point #10a of FIG. 4), such that the unicast session could be established (e.g., the unicast session could be back up and running) prior to the RW operation reaching the beginning of the UED's buffer. Once the unicast session is reestablished, and assuming that the RW operation is still in effect, the displayed content provided to a display device associated with the UED may be switched from the content stored in the buffer of the UED to the recorded content received via the (re)established unicast session.

In some embodiments, and particularly those embodiments where the recorded content is downloaded to the memory or buffer of the UED, a unicast session might not be (re)established. For example, the recorded content that is downloaded to the memory or buffer might be used to support a RW operation at the UED.

In addition to supporting the RW operation, the storage of the broadcast or multicast content starting at 9:10 PM and coinciding with point #3a of FIG. 4 may also facilitate terminating a (first) unicast session (as that termination is brought about via points #6-8 in FIGS. 3 and 4) at an earlier point in time. For example, a user might not have to "catch-up" to the broadcast or multicast distribution of the content to switch from displaying content based on unicast to displaying the content based on broadcast or multicast distributions. Instead, the switch could take place once the user has either viewed and/or FF'd through the unicast content until the point is reached where the content is available in the buffer of the UED (which would coincide with point #3a of FIG. 4 or optionally at some other later point in time when saving the broadcast or multicast content at the UED began).

Figure 5:
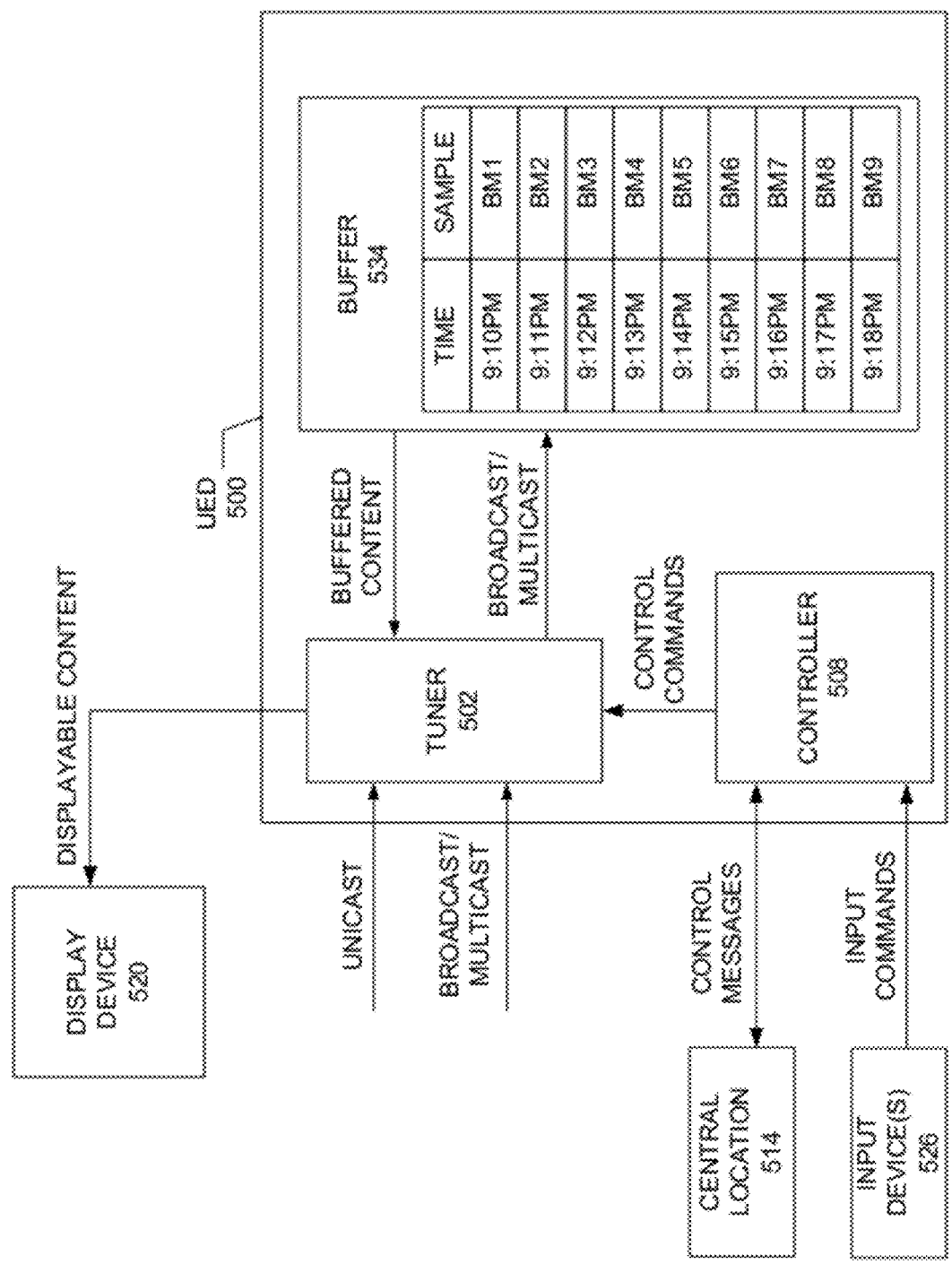
FIG. 5 illustrates an example architecture for presenting content in accordance with one or more aspects of this disclosure.

FIG. 5 illustrates an example architecture that may be used in connection with embodiments of this disclosure. In some embodiments, additional components and devices may be included beyond what is shown in FIG. 5. For example, decryption circuits, demodulation circuits, filters, and other such components and devices known to those skilled in the communication and processing arts may be included in some embodiments. In some embodiments, different components and devices may be substituted for those shown in FIG. 5. In some embodiments, some components and devices may be eliminated or omitted relative to what is shown in FIG. 5.

The architecture of FIG. 5 includes a UED 500. In some embodiments, UED 500 may include one or more components or devices shown in connection with computing device 200 of FIG. 2. For example, UED 500 may include a processor (e.g., processor 201 of FIG. 2) and memory (e.g., ROM 202 and/or RAM 203 of FIG. 2) storing instructions that, when executed by the processor, cause UED 500 to perform one or more of the methodological acts described herein.

As shown in FIG. 5, UED 500 may include a tuner 502. Tuner 502 may receive unicast and/or broadcast/multicast transmissions, or other types of transmissions. While not shown in FIG. 5 as such, the unicast and broadcast/multicast transmissions may originate from or be transmitted by a central location 514. In some embodiments, central location 514 may be analogous to central office 103 of FIG. 1. Also, while shown as separate inputs to tuner 502 in FIG. 5, in some embodiments the unicast and broadcast/multicast transmissions may be combined and received at tuner 502 as a single transmission. While not shown in FIG. 5, tuner 502 may include a multiplexer or other equivalent circuits and logic to drive the displayable content provided to a display device 520 as described further below. While not shown in FIG. 5, in some embodiments tuner 502 may include another input to receive and download recorded content to a buffer 534.

UED 500 may include a controller 508. Controller 508 may exchange control messages with central location 514. Those control messages may (re)establish and terminate a unicast session between UED 500 and central location 514 (or any other device). Controller 508 may also be configured to receive one or more input commands from one or more input devices 526. The input commands may include a selection of content that a user wishes to view/consume, a command to record content, commands relating to the playback of content (e.g., fast forward, rewind, pause live playback, etc.), and the like. Input device(s) 526 may include one or more remote controls, mobile devices, computers, and the like. Based on the exchanged control messages between controller 508 and central location 514, and in response to input commands received from input device(s) 526, controller 508 may issue one or more control commands to tuner 502.

UED 500 may include buffer 534 that may be used to store broadcast, multicast, or other transmissions as they are received at UED 500. For example, and in reference to the earlier example of a user recording a program from 9:00 PM-9:30 PM and initiating a playback of the recording starting at 9:10 PM, tuner 502 may tune to and forward the broadcast/multicast content corresponding to the program starting at 9:10 PM (or at some later time) to buffer 534, and buffer 534 may store the broadcast/multicast content corresponding to the program from that point forward. For purposes of illustrative simplicity, buffer 534 is shown in FIG. 5 at 9:19 PM as having stored nine samples (BM1-BM9) of broadcast/multicast content in one minute intervals starting from 9:10 PM. In some embodiments, buffer 534 may be organized or structured in a different manner, and the number of samples may not be the same for all of the time intervals.

In the event that the memory capacity of buffer 534 is exhausted, one or more criteria may be applied to determine which sample or samples to delete. For example, a first-in-first-out (FIFO) approach may be used, such that the oldest in time sample is eliminated in order to make room for a newly received sample. Thus, continuing the example described above, if a new sample (e.g., BM10) was recorded between 9:19 PM and 9:20 PM, that new sample may replace the oldest sample (corresponding to BM1 taken between 9:10 PM and 9:11 PM). A FIFO approach may be especially beneficial in the context of supporting a rewind (RW) operation as described herein by reducing the likelihood of having to (re)establish a unicast session, particularly in those embodiments where the recorded content is not downloaded to buffer 534.

Figure 6:
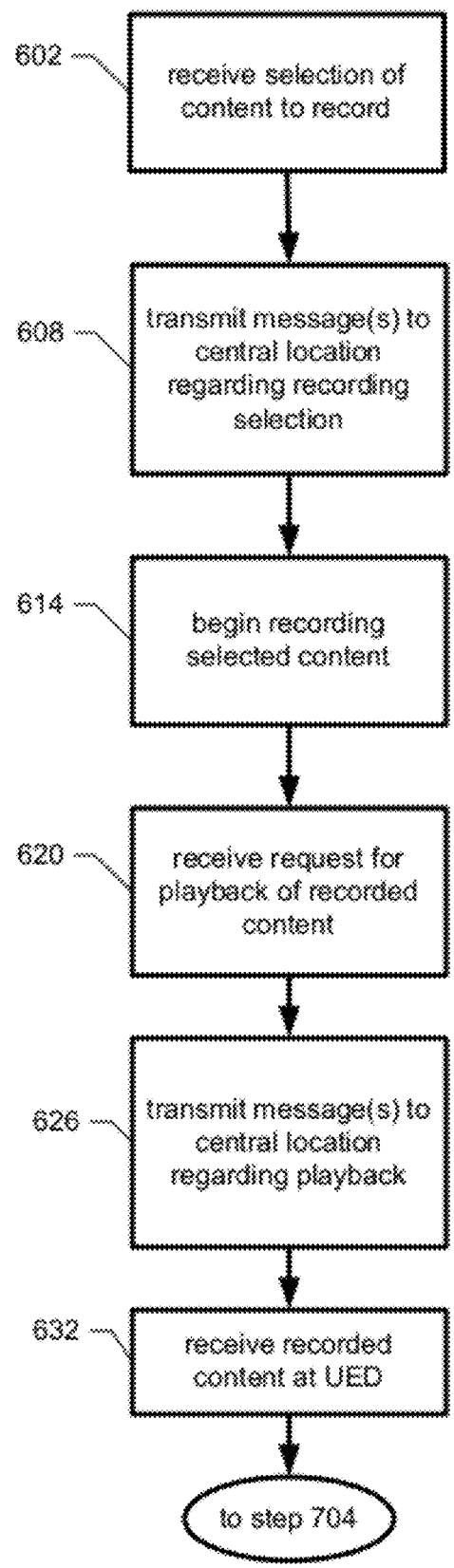
FIGS. 6-7 illustrate a method suitable for demonstrating one or more aspects of this disclosure.
Figure 7:
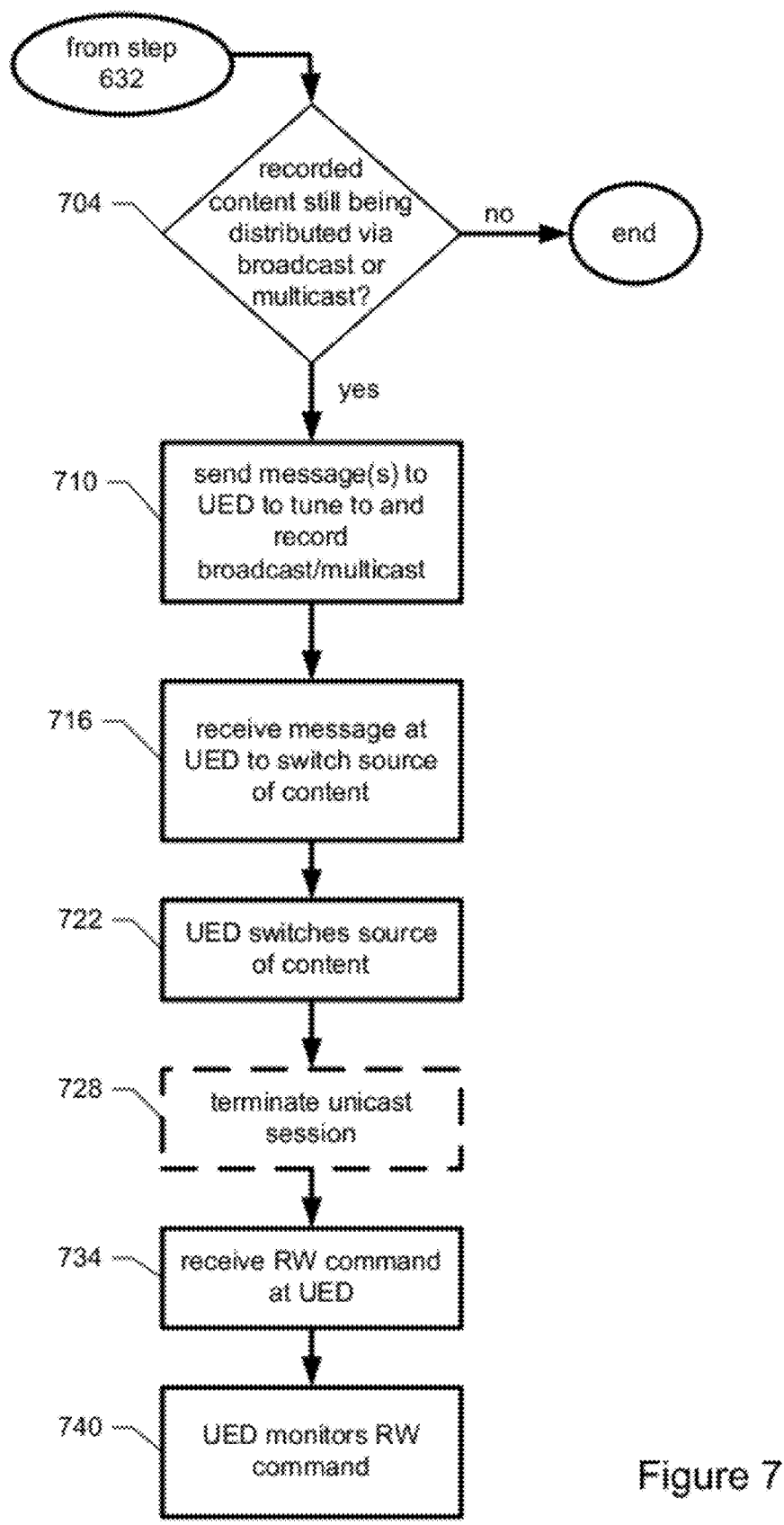

Tuner 502 may generate, drive, or distribute displayable content suitable for display on display device 520. While shown as a separate device in FIG. 5, display device 520 may be included in or integrated with UED 500 in some embodiments. The displayable content received at display device 520 may correspond to one or more of the downloaded content, unicast content, broadcast/multicast content and buffered content received at tuner 502. FIGS. 6 and 7, which are described further below, illustrate a method that may be used in connection with the architecture shown in FIG. 5 to select which of the downloaded, unicast, broadcast/multicast and buffered content received at tuner 502 is used to drive the displayable content provided to display device 520.

Referring to the method of FIGS. 6 and 7, in step 602 a user selection of content to record may be received, for example, at UED 500 of FIG. 5. The user may select the content to record using one or more input devices, such as input device(s) 526 of FIG. 5.

In step 608, if NDVR recording services are used, UED 500 (using, for example, controller 508) may transmit one or more messages to central location 514 (or any other device) advising the central location of the user's selection(s). In response to receiving those messages, central location 514 may schedule a recording of the content. In reference to the earlier examples, steps 602 and 608 may correspond to point #1 of FIG. 3 and point #1 of FIG. 4.

In step 614, a beginning of the recording of the content may take place. If NDVR recording services are used, the recording may take place at central location 514 or at some other network device. In reference to the earlier examples, step 614 may correspond to point #2 of FIG. 3 and point #2 of FIG. 4.

In step 620, UED 500 (e.g., controller 508) may receive an input command from one or more input devices 526 requesting a playback of the recorded content. In reference to the earlier examples, step 620 may correspond to point #3 of FIG. 3 and point #3 of FIG. 4.

In step 626, UED 500 may transmit one or more messages to central location 514 (or any other device) advising central location 514 (or the any other device) of the user's desire to playback the recorded content (in response to the input command received in step 620).

In step 632, and in response to the one or more messages received in connection with step 626, central location 514 (or any other device that has been used to record the requested content) may transmit the recorded content to the UED 500 to facilitate a playback of, or access to, the recorded content, for example, on display device 520. The transmission of the recorded content may include one or more of establishing a unicast session between central location 514 (or any other device that has been used to record the requested content) and UED 500 and downloading the content to UED 500. In connection with step 632, UED 500 may receive the recorded content. In reference to the earlier examples, step 626 and 632 may correspond to point #4 of FIG. 3 and point #4 of FIG. 4.

As shown in FIG. 7 (which may represent a continued progression of the method illustrated in FIG. 6), in step 704 central location 514 (or any other device) may determine whether the recorded content is still being distributed via a broadcast or multicast transmission. If not (e.g., the "No" path is taken out of step 704), then the unicast distribution of the recorded content may continue until the user terminates the session, or a playback of the recorded content as downloaded may continue, and the method may then end. Otherwise, if the recorded content is still being distributed via broadcast or multicast (e.g., the "Yes" path is taken out of step 704), then in step 710 central location 514 (or any other device) may transmit one or more messages to UED 500 directing UED 500 to tune to and record in buffer 534 the broadcast and/or multicast transmission corresponding to the selected content, for example, as it is received at tuner 502. In some embodiments, there may be a delay in the progression from steps 620 to 710, or that is to say, that a recording of a broadcast or multicast distribution need not take place immediately following a user request to playback the recorded content in connection with step 620. In reference to the earlier examples, the progression from step 704 to step 710 may correspond to point #3a of FIG. 4.

In step 716, central location 514 (or any other device) may determine that the playback of the recorded content at UED 500 has either: (1) caught-up to the distribution of the content via broadcast or multicast, or (2) caught-up to a point that the content is available in buffer 534 as a result of the recording conducted in conjunction with step 710. In response to making that determination, central location 514 (or any other device) may transmit one or more messages to UED 500 directing UED 500 (for example, tuner 502, optionally by way of controller 508) to switch the content, presented to display device 520 for example, to either (1) the broadcast or multicast distribution, or (2) the buffered content from buffer 534, as appropriate. In reference to the earlier examples, step 716 may correspond to point #6 of FIG. 3 and point #6 of FIG. 4.

In some embodiments, and particularly in those embodiments where UED 500 receives the recorded content via a download, UED 500 may compare or examine one or more tags or flags included with the recorded content to determine when to begin driving display device 520 with content other than the downloaded content, e.g., content received via broadcast or multicast.

In step 722, UED 500 (e.g., tuner 502 included therein) may switch the content, provided to display device 520 for example, from the recorded content received via unicast (or the recorded content that is downloaded and saved to buffer 534) to either content received via broadcast or multicast or the content as it is stored in buffer 534 based on step 710. As part of making the switch associated with step 722, UED 500 may send one or more acknowledge (ACK) messages to central location 514 (or any other device). In reference to the earlier examples, the ACK messages that UED 500 may transmit in connection with step 722 may correspond to point #7 of FIG. 3 and point #7 of FIG. 4.

Responsive to receiving the ACK message(s) of step 722, or after a predetermined timeout if no such ACK message(s) is received, central location 514 (or any other device) may terminate a unicast distribution of the recorded content in step 728 (if a unicast session was open to support the transmission of the recorded content to UED 500). In reference to the earlier examples, step 728 may correspond to point #8 of FIG. 3 and point #8 of FIG. 4.

In step 734, a rewind (RW) command may be received at UED 500 from one or more input devices 526. If prior to step 734 UED 500 (and more specifically tuner 502) was providing displayable content to display device 520 using the broadcast or multicast content received at tuner 502, step 734 may also include UED 500 (e.g., tuner 502) switching the provided displayable content from the broadcast or multicast distribution to the content that is stored in buffer 534. In reference to the earlier examples, step 734 may correspond to point #9 of FIG. 3 and point #9 of FIG. 4.

In step 740, UED 500 may monitor the RW operation. For example, UED 500 may determine whether the RW operation has progressed to the point that the displayable content being provided to display device 520 is within a threshold of the oldest sample available in buffer 534. If the threshold is reached, UED 500 may transmit one or more messages to central location 514 (or any other device) requesting that a unicast session be (re)established in order to ensure that the unicast session is up and running prior to the RW operation surpassing the oldest sample available in buffer 534. In this manner, UED 500 can switch the displayable content provided to display device 520 from the content stored in buffer 534 to the unicast (recorded) content received at tuner 502 in a way that is transparent to the user of display device 520. In reference to the earlier examples, step 740 may correspond to point #10a of FIG. 4.

In some embodiments, and particularly in those embodiments where the recorded content is downloaded and saved in buffer 534, step 740 might not be used, as the recorded content may be available locally to UED 500.

Based on the description provided herein, aspects of this disclosure may allow a service provider to more efficiently utilize network resources. For example, unicast sessions may represent a significant expense to service providers in terms of bandwidth and utilization. Aspects of this disclosure may minimize the use of unicast sessions by switching the content that is presented on a display device to content that is received in connection with a broadcast or multicast distribution or content that is stored in a buffer of a user equipment device (UED). The switching between unicast, broadcast, multicast, and buffered content may take timing characteristics into account such that the change is transparent to an end user. For example, in the context of television content or television programming, the switch may be made during an I-frame or the like.

In some embodiments, additional system considerations may be taken into account to determine whether switching is even advisable. Referring to the example of a user recording a program between 9:00 PM and 9:30 PM described herein, if the user initiates the playback of the recording from its beginning starting at 9:28 PM (as opposed to 9:10 PM as described earlier), it might not make sense to direct the user equipment device to tune to and record the broadcast or multicast distribution in its memory/buffer as a mere two minutes would be remaining before the broadcast/multicast distribution of the program would terminate. In some embodiments, a central location (or any other device directing the switching in connection with the UED) may maintain a profile of either a user or the user's equipment device to determine whether it would be advisable to perform any recording or switching at the UED based on: (1) fast forward or rewind speeds associated with the user equipment device, (2) historical data or statistics associated with a particular user in terms of whether the user is likely to fast forward or rewind content, and the like. More generally, a recording/saving of the broadcast/multicast content at the UED may be based at least in part on a determination that a probability of the UED catching-up to the broadcast/multicast content in terms of a playback of the recorded content (or more generally, access of the recorded content) at the UED is above a threshold.

Aspects of this disclosure may readily be applied to, and adapted to be operative on, one or more communication systems. Those communication systems may include computer networks, television networks, satellite networks, telephone and cellular networks, and the like.

Although not required, various aspects described herein may be embodied as a method, a data processing system, and/or as a transitory and/or non-transitory computer-readable medium storing executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. Moreover, the structural components described herein may be distributed amongst one or more devices, optionally within a common housing or casing.

Various signals representing content, data, or events as described herein may be transferred between a source and a destination in the form of electromagnetic waves traveling through signal-conducting media such as metal wires, optical fibers, and/or wireless transmission media (e.g., air and/or space).

Although broadcast, multicast, and unicast transmission techniques have been discussed in the example embodiments, the disclosure relates to and encompasses other transmission techniques. In some embodiments, one or more content providers (or devices or equipment associated therewith) may be configured to provide content using one or more transmission techniques.

The various methods and acts may be operative across one or more computing servers and one or more networks. The functionality may be distributed in any manner, or may be located in a single computing device (e.g., a server, a client computer, etc.). As discussed herein, content may be distributed to intermediary/network components and client-side devices at various times and in various formats. The distribution and transmission techniques described herein may leverage existing components and infrastructure to minimize power dissipation, operational complexity, footprint size, and management involvement, amongst other factors and costs.

The methodological acts and processes may be tied to particular machines or apparatuses. For example, as described herein, content may distributed to a user location via one or more computing devices (e.g., servers) and that content may be displayed at the user location via one or more UEDs and/or display devices. The content may be formatted in accordance with one or more transmission techniques, types, or protocols, such as broadcast and narrowcast. More generally, one or more computers may include one or more processors and memory storing instructions, that when executed, perform the methodological acts and processes described herein. Furthermore, the methodological acts and processes described herein may perform a variety of functions including transforming an article (e.g., displayed content corresponding to content received via a unicast distribution model) into a different state or thing (e.g., displayed content corresponding to content received via a multicast or broadcast distribution model, where the change from unicast is transparent to the user).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above in any order. It will also be appreciated and understood that modifications may be made without departing from the true spirit and scope of the present disclosure. The description is thus to be regarded as illustrative instead of restrictive on the present disclosure.

What is claimed is:

1. A method comprising:
   transmitting, to a user equipment device, recorded content using a first transmission technique;
   determining at least one of a fast forward speed capability of the user device and a rewind speed capability of the user device;
   determining, based on the at least one of the fast forward speed capability of the user device and the rewind speed capability of the user device, a time to transmit a message to the user device that directs the user device to terminate receiving the recorded content transmitted using the first transmission technique;
   transmitting, at the determined time, the message from a central location to the user device that directs the user device to terminate receiving the recorded content transmitted using the first transmission technique; and
   causing the user device to switch to content provided by a second transmission technique.

2. The method of claim 1, wherein the first transmission technique comprises a unicast transmission technique.

3. The method of claim 1, wherein the second transmission technique comprises at least one of a broadcast transmission technique and a multicast transmission technique.

4. The method of claim 1, further comprising:
   causing the user device to retrieve stored content from a buffer associated with the user device.

5. The method of claim 1, further comprising:
   transmitting a second message to the user device that directs the user device to store the content provided by the second transmission technique, wherein the content provided by the second transmission technique corresponds to the recorded content at a point in time different from when a recording of the recorded content began.

6. The method of claim 1, further comprising:
   after transmitting the message to the user device, receiving an acknowledgment message from the user equipment device, wherein the acknowledgment message indicating that a transmission of the recorded content using the first transmission technique to the user device can be terminated.

7. The method of claim 1, further comprising:
   during transmission of the recorded content using the first transmission technique, receiving a fast forward command; and
   responsive to receiving the fast forward command, causing the user device to retrieve stored content from a buffer associated with the user device.

8. The method of claim 1, further comprising:
   responsive to a rewind command at an instant in time, causing the user device to retrieve stored content from a buffer associated with the user device, wherein the stored content from the buffer corresponds to the content provided by the second transmission technique at the instant in time.

9. The method of claim 8, further comprising:
   receiving a second message requesting receipt of the recorded content using the first transmission technique, wherein the second message indicates that content sourced from the buffer is within a threshold amount of an oldest sample of content stored in the buffer.

10. A method comprising:
    receiving, at a user device, recorded content that is transmitted using a first transmission technique;
    determining at least one of a fast forward speed capability of the user device and a rewind speed capability of the user device;
    responsive to a determination, based on the at least one of the fast forward speed capability of the user device and the rewind speed capability of the user device, of a time to transmit a message from a central location to the user device that directs the user device to terminate receiving the recorded content transmitted using the first transmission technique, receiving, at a time corresponding to the determined time and at the user device, the message from the central location; and
    responsive to receiving the message, switching to the content provided by a second transmission technique.

11. The method of claim 10, wherein the first transmission technique comprises a unicast transmission technique.

12. The apparatus of claim 10, wherein the second transmission technique comprises at least one of a broadcast transmission technique and a multicast transmission technique.

13. The method of claim 10, further comprising:
    responsive to receiving the content provided by the second transmission technique, storing the content provided by the second transmission technique in a buffer associated with the user device.

14. The apparatus of claim 10, further comprising:
    during a display of the content provided by the second transmission technique, receiving a rewind command; and
    responsive to receiving the rewind command, switching from the content provided by the second transmission technique to content stored on a buffer associated with the user device.

15. A method comprising:
    transmitting, to a user device, recorded content using a first transmission technique;
    during transmission of the recorded content using the first transmission technique, receiving a fast forward command from the user device; and
    responsive to receiving the fast forward command and a determination, based on a fast forward speed capability of the user device, that the user device can either access live content corresponding to the recorded content using a second transmission technique or stored content from a buffer of the user device, terminating the transmission of the recorded content using the first transmission technique.

16. The apparatus of claim 15, wherein the first transmission technique comprises at least one of a unicast transmission technique and a downloading technique, and wherein the second transmission technique comprises at least one of a broadcast transmission technique and a multicast transmission technique.

17. The apparatus of claim 15, further comprising:
    transmitting a message to the user device directing the user device to store, in the buffer of the user device, the live content received at the user equipment device via the second transmission technique.

18. The apparatus of claim 17, wherein the transmitting the message is based at least in part on a determination that a probability of the user device catching-up to the second transmission technique in terms of access of the recorded content is above a threshold.

19. The method of claim 15, wherein terminating the transmission comprises:
responsive to the determination, based on the fast forward speed capability of the user device, that the user device can access the stored content from the buffer of the user device, causing the user device to access the stored content from the buffer of the user device.

20. The method of claim 19, wherein the fast forward command comprises a first fast forward command, the method further comprising:
responsive to receiving a second fast forward command subsequent to receiving the first fast forward command and a determination, based on the fast forward speed capability of the user device, that the user device can access the live content corresponding to the recorded content using the second transmission technique, causing the user device to switch from the stored content from the buffer of the user device to the live content corresponding to the recorded content provided using the second transmission technique.

* * * * *

UNITED STATES PATENT AND TRADEMARK OFFICE
CERTIFICATE OF CORRECTION

| | | |
|---|---|---|
| PATENT NO. | : 9,167,295 B2 | |
| APPLICATION NO. | : 13/154722 | |
| DATED | : October 20, 2015 | |
| INVENTOR(S) | : Amit Garg | |

It is certified that error appears in the above-identified patent and that said Letters Patent is hereby corrected as shown below:

In the Claims

Column 13, Line 11:
    In Claim 1, after "user", please delete "equipment"

Column 13, Line 45:
    In Claim 6, after "user", delete "equipment"

Column 13, Line 46-47:
    In Claim 6, delete "indicating" and insert --indicates--

Column 13, Line 67:
    In Claim 9, after "that", insert --the stored--

Column 14, Line 1:
    In Claim 9, before "from", delete "sourced"

Column 14, Line 18:
    In Claim 10, after "to", delete "the"

Column 14, Line 22:
    In Claim 12, delete "apparatus" and insert --method--

Column 14, Line 30:
    In Claim 14, delete "apparatus" and insert --method--

Column 14, Line 52:
    In Claim 16, delete "apparatus" and insert --method--

Signed and Sealed this
Twelfth Day of July, 2016

Michelle K. Lee
*Director of the United States Patent and Trademark Office*

CERTIFICATE OF CORRECTION (continued)
U.S. Pat. No. 9,167,295 B2

Column 14, Line 58:
    In Claim 17, delete "apparatus" and insert --method--

Column 14, Line 61:
    In Claim 17, after "user", delete "equipment"

Column 14, Line 63:
    In Claim 18, delete "apparatus" and insert --method--